United States Patent [19]

Bonneau et al.

[11] Patent Number: 4,799,792
[45] Date of Patent: Jan. 24, 1989

[54] METHOD TO TEST THE POLISHING OF A MIRROR AND SYSTEM TO USE THIS METHOD

[75] Inventors: Alain Bonneau, Auteuil; Jacques Paseri, Le Plessis Robinson, both of France

[73] Assignee: Societe d'Etudes Techniques et d'Entreprises Generales - Sodeteg, Le Pelessis Robinson, France

[21] Appl. No.: 75,980

[22] Filed: Jul. 21, 1987

[30] Foreign Application Priority Data

Jul. 22, 1986 [FR] France ............................ 86 10616

[51] Int. Cl.$^4$ .............................................. G01B 9/00
[52] U.S. Cl. ................................................. 356/124
[58] Field of Search ...................... 356/124; 250/239; 51/165, 72, 373, 393; 350/582, 584, 589, 590

[56] References Cited

U.S. PATENT DOCUMENTS 4,536,789  8/1985  Bairs ................................. 350/584

FOREIGN PATENT DOCUMENTS 0781042  11/1980  U.S.S.R. ............................ 51/373

OTHER PUBLICATIONS

Optics and Laser Technology, vol. 4, No. 5, Oct. 1972, pp. 228–233, Haywards Heath, GB; J. P. Marioge et al., "Fabry–Perot, Interferometer Surfacing".

Primary Examiner—Richard A. Rosenberger
Assistant Examiner—Crystal Cooper
Attorney, Agent, or Firm—Oblon, Fisher, Spivak, McClelland & Maier

[57] ABSTRACT

The invention pertains to a method to test the polishing of a mirror by means of a testing device, in a fluid through which rays of light are propagated homogeneously, and a system that puts this method into use. The method consists in placing the mirror on a support, in fixing this support imperviously to one end of a flexibly shaped and/or folding chamber in such a way that its internal volume can be elminated, the testing device being at an opposite end of the chamber, and it further consists in driving out the residual air contained in the chamber is driven out by eliminating its internal volume, then in injecting a volume of fluid into the chamber so that the polishing can be tested, the said testing being done before the support and the mirror are removed in order to correct faults or to finally package the mirror.

22 Claims, 3 Drawing Sheets

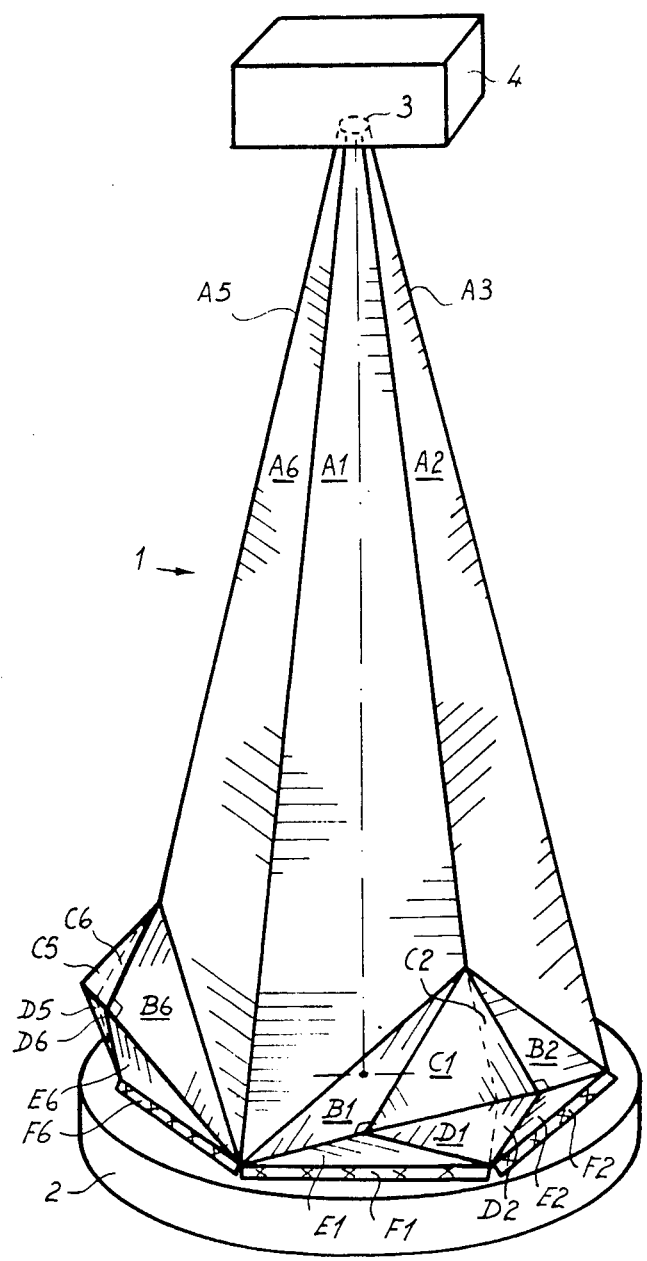
FIG_1

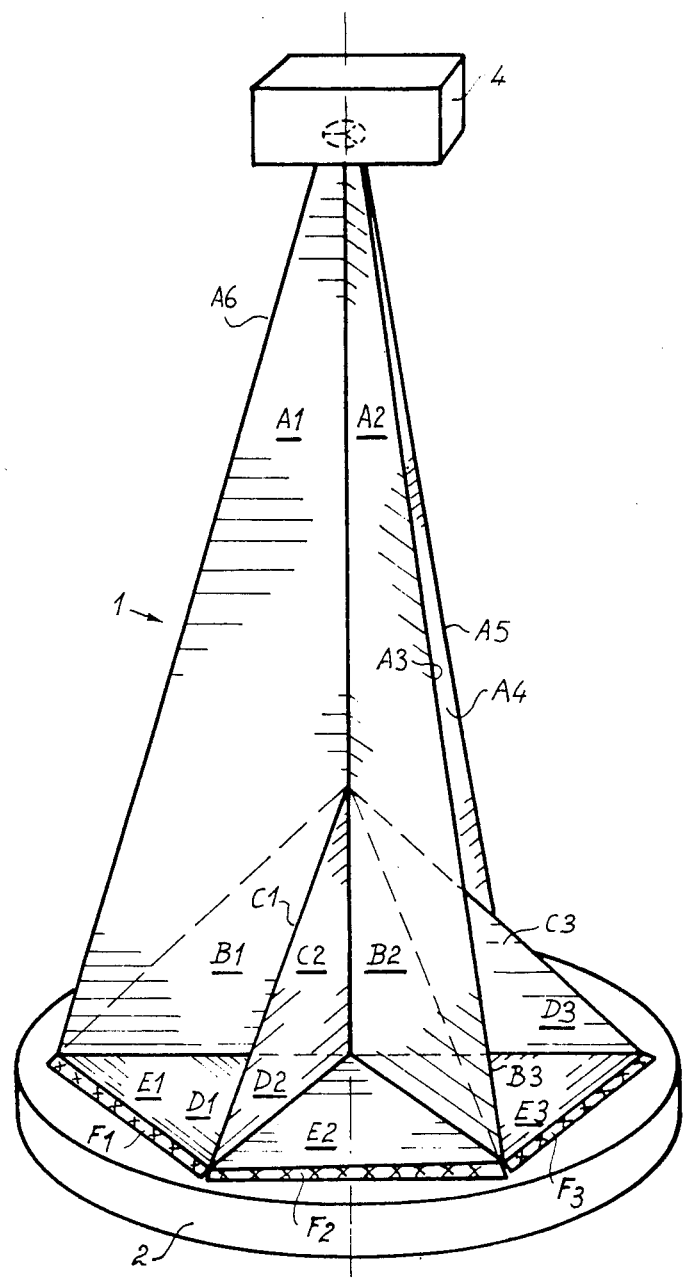
FIG_2

FIG_3-a
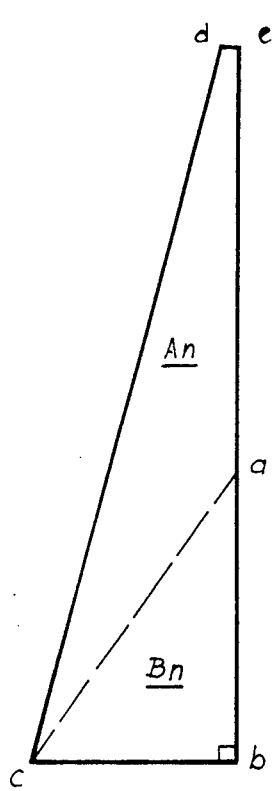
FIG_3-b
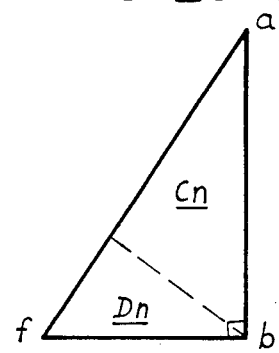
FIG_3-c
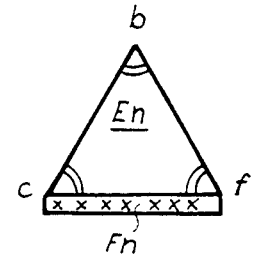
FIG_4-a
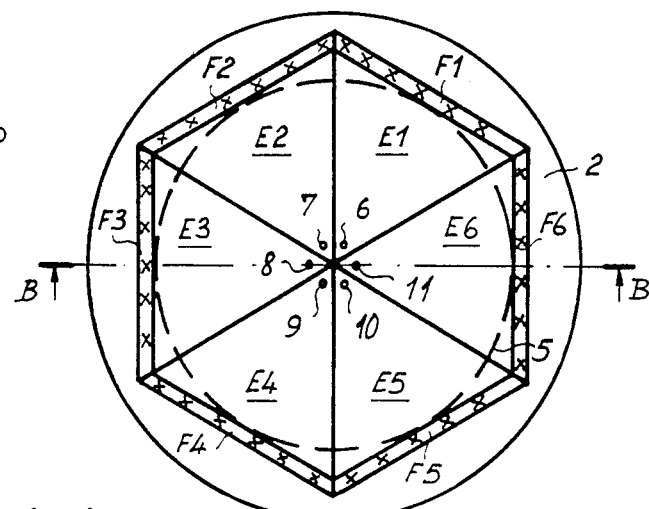
FIG_4-b
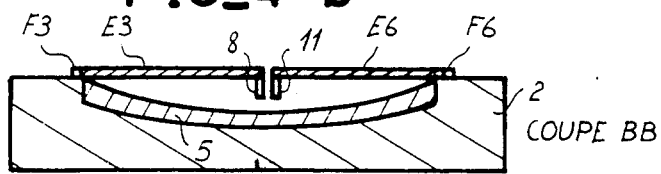
COUPE BB

METHOD TO TEST THE POLISHING OF A MIRROR AND SYSTEM TO USE THIS METHOD

BACKGROUND OF THE INVENTION

1. Field of the Invention

The invention pertains to a method for optical tests, and to a system of tests to use the method, designed especially for testing the polishing of large-diameter precision mirrors, namely precision mirrors with diameters of more than 1 meter.

2. Brief Description of the Prior Art

Precision mirrors are used, for example, in telescopes or more generally, in optical systems designed for measurement and/or observation. Mirrors of this type have to be flawless, and their polishing has to be subjected to several tests during manufacture, these tests being generally done by interferometry.

Interferometry uses a light source, placed at the focus of the mirror, which may sometimes be at about 30 meters from the mirror. Once the distance becomes great, the tests may be disturbed by a variation in the refractive index of the air caused by air movements such as air currents, convection movements or heat stratification phenomena. Once the diameter of the mirror exceeds two meters, it becomes extremely difficult to make the measurements, and there are no known answers to this problem when the diameter exceeds four meters. Furthermore, methods of the prior art which can be applied to small-diameter mirrors are difficult to apply or, when it is still possible to use them, they prove to be costly.

Thus, there is the prior art method of measurement under partial vacuum in which the entire equipment has to be enclosed in a vacuum chamber. This system is heavy, bulky and costly. In practice it is difficult this method to apply to mirrors with diameters of more than three meters, because of the power needed for the vacuum pumps and the extra size that must be given to the walls of the chamber so that thes can bear the external pressure.

In a second method, the tests are conducted in a helium atmosphere: helium has a refractive index that varies very little with the temperature, and it possesses better light-propagating characteristics. However this method implies removing the air when filling the chamber with helium. This fact creates problems similar to those of the method of measurement under partial vacuum, and the helium must be recovered after measurement so as to re-use it for the next measurement for, if an aberration is detected in the mirror during a measurement, the required rectification must be made immediately. Thus, there may be several tens of measurements to be made when manufacturing a mirror, constantly raising the problem of removing air, filling the enclosure with testing fluid and recovering it.

An object of the invention, therefore, is a method which can be applied to all types of mirrors, especially large-diameter mirrors, enabling measurements to be made in a helium atmosphere or, more generally, in a fluid in which the path of the light rays is not disturbed, a method which requires a low-weight and compact system for its application.

3. Summary of the Invention

The invention pertains to a method to test the polishing of a mirror by means of a testing device in a fluid through which light is propagated homogeneously, a method wherein the mirror is placed on a support, this support is fixed imperviously to one end of a chamber which is flexibly shaped (i.e. capable of changing its shape) and/or folding in such a way that its internal volume can be eliminated, the testing device being at an opposite end of the chamber, a method wherein the residual air contained in the chamber is driven out by eliminating its internal volume, then a volume of fluid is injected into the chamber so that the polishing can be tested under efficient optical conditions, the said testing being done before the support and the mirror are removed in order to correct faults or to perform any other operation, for example its final packaging.

The invention also pertains to a system for the use of the method, comprising a support for the mirror, a testing device and a flexibly shaped and/or folding chamber, at one first end of which is fixed the testing device, means for the impervious fixing of the support to an opposite end of the chamber, means to remove the residual air from the chamber, means to inject the fluid into the chamber and means to remove the fluid from the chamber.

According to another characteristic of the method of the invention, the operation to inject fluid and remove residual air is done by leaving the measuring device and support in the position that they occupy for the measurement.

The method of the invention is, therefore, especially advantageous since, to remove any residual air in the chamber, it is enough to perform an operation comparable to the deflation of the chamber (an operation facilitated by the external atmospheric pressure), this operation being done while leaving the measuring device and support in the position occupied by them for the measurement. According to another characteristic of the invention, in order to quickly drive the air out of the chamber, a depression is created within it using a vacuum pump.

According to another characteristic of the invention, after making a measurement, the fluid used for the test is recovered before the mirror is removed from the chamber for correction or for any other operation.

In a system to use the method of the invention, the walls of the chamber at least partly comprise panels made of a highly resistant cloth impervious to the fluid, and their shape is such that they can take a position in which there is no remaining air pocket and a position in which a measuring device can be used to test the entire surface of the mirror.

BRIEF DESCRIPTION OF THE DRAWINGS

Other characteristics and advantages of the invention will become clear from the following description of some embodiments made with reference to the appended figures, of which:

FIG. 1 is a perspective view of an embodiment of a part of a system to apply the method of the invention, after the fluid has been injected into the chamber, FIG. 2 is a perspective view of the elements of FIG. 1 when the residual air has been driven out of it, FIGS. 3a, 3b and 3c are views of elements constituting the system of FIGS. 1 and 2.

FIG. 4a is a view from the top of the system of the preceding figures, when its internal volume is eliminated, FIG. 4b is a cross-section view of a part of FIG. 4a.

DESCRIPTION OF THE PREFERRED EMBODIMENT OF THE INVENTION

FIG. 1 shows a part of a system to apply the method of the invention. A system of this type comprises a chamber 1 intended to be filled with a fluid in which light rays can take a homogeneous path; it also comprises a support 2 for the mirror that is to be tested, this support 2 being capable of being imperviously fixed to one end of the chamber to form one of its walls, as well as a testing device 4 at the opposite end 3 of the chamber 1 from the support 2.

The testing device 4 is also imperviously fixed to the chamber 1.

The testing device 4, which is known per se, is an interferometer, for example, and the dimensions of the chamber 1 are such that the said device is at the focus of the mirror tested. When filled with testing fluid, the chamber has a general truncated cone shape, the base of the cone being formed by the support 2 of the mirror and the testing device 4 being near the vertex. This kind of shape makes it possible to check the entire surface of a mirror placed on the support without it's being necessary to shift the testing device 4 and/or the mirrors.

The chamber 1 is of a felxible shape so that its internal volume can be eliminated by constantly maintaining the support 2 and the end 3 in the position that they each occupy when the volume of the chamber is at its maximum, i.e. in its testing position.

The fluid used for the tests is preferably helium. The testing system comprises a reserve and/or generator of fluid (not shown in the figures) which is made to communicate with the interior of the chamber through at least one conduit. If necessary, there may also be a transfer pump between the chamber and the reserve and/or generator.

The reserve is preferably shaped like a bladder with an internal volume which is at least equal to that of the chamber in the testing position. Thus, to transfer the fluid from the bladder to the chamber and vice versa, it suffices to use very little power, since the bladder is deflated when the chamber 1 is filled. Furthermore, the fluid can be recovered by means of a reverse transfer: in this case, it is the chamber 1 which has its volume reduced as and when the vessel is filled as it is being inflated.

In one mode of embodiment, two fluid-circulation circuits are provided, one for the passage of fluid from the chamber to the bladder and another for the its passage from the bladder to the chamber, each of these circuits comprising a pump with only one flowing direction.

Preferably, a fluid generator or an ancillary reserve communicates with the bladder to provide additional fluid compensating for losses which might occur if the mirror and the support 2 are detached from the chamber 1 for a rectifying operation before all the fluid has sent back to the bladder or reserve. Moreover, as explained further below, the material constituting the chamber 1 may (depending on its nature) have leaks which must be compensated for. This can be done by means of the ancillary reserve.

The system to apply the invention further comprises, in a preferred embodiment, a vacuum pump with its suction hole communicating with the inside of the chamber, so as to enable the residual air to be removed from the chamber whenever the support 2 that has just been re-positioned in front of the mirror, before injecting the fluid for a testing operation.

In the embodiment corresponding to the figures, the chamber 1 has a truncated cone shape and comprises parts made of a cloth impervious to fluid, as well as rigid parts E1, E2 . . . E6 which, during the folding operation to drive air out, are brought to face the mirror in order to prevent the cloth from coming into contact with the mirror and damaging the state of its surface condition.

The chamber 1 has the general shape of a six-sided truncated cone, connected at one end 3 to the testing device 4 by means of a fixed, hexagonal support. It must be noted that the support may be a part of the testing device 4 as shown in the figure. The other end of the chamber, corresponding to the base of the truncated cone, is to be connected to the support 2 by means of the elements F1, F2 . . . F6, which are arranged so that the support can be quickly positioned and removed, and so as to ensure an efficient degree of imperviousness.

Thus, the fixing may be done by means of screws, nuts, catches or any other similar means fulfilling the same function. The fixing means are symbolized by crosses in the figure.

The elements F1, F2, F3 . . . F6 demarcate a hexagon on the support 2. The dimensions of this hexagon are such that the mirror can be placed within it.

The rigid elements E1, E2, E3 . . . E6 of the chamber 1 are panels in the shape of equilateral triangles, hinged by one of their sides on the fixing elements F1, F2, F3 . . . F6. Each of the sides of these rigid elements is equal to one side of the hexagon demarcated by the fixing elements F1, F2 . . . F6. Furthermore, the rigid panels are hinged in such a way that they can be folded down on the surface of the hexagon and can thus prevent the mirror from coming into contact with the cloth parts of the chamber 2. The hinging means are planned to preserve the imperviousness of the chamber.

The general truncated cone shape of the chamber is obtained by means of six panels A1, A2 . . . A6, preferably made of cloth. The panels are joined together two by two. Their joining lines form six cone-generating lines when the chamber is full of fluid, thus making it possible for the test to be conducted.

The six joining lines all start from the testing device 4 in the direction of each of the corners of the hexagon determined by the hinging line of the rigid parts E1, E2 . . . E6 on the support 2. One out of every two joining lines ends at one of two corners of the hexagon while the other of each pair of joining lines ends at a blower which has the role of providing for an optimum discharge of air before filling the chamber with fluid, or for a maximum discharge of fluid after testing.

Thus, the joining lines between the panels A1 and A2, A3 and A4, A5 and A6 each end in a blower and the joining lines between the panels A2 and A3, A4 and A5, A6 and A1 each end at one out of two corners of the hexagon.

Each blower is formed symmetrically on either side of a plane passing through the axis of the cone and the joining line ending at the said blower.

FIG. 1 gives a full view of the blower located beneath the panels A1 and A2 and a partial view of the blower located between the panels A5 (hidden in the figure) and A6. However, the blower common to the panels A3 and A4 cannot be seen.

Thus the blower common to the panels A1 and A2 comprises firstly two triangular panels B1 and B2. One of these panels B1 has a common side with the panel A1 and the other triangular panel B2 has a common side with the panel A2.

The side common to the panel A1 and the panel B1, as well as the side common to the panel A2 and the panel B2 and, more generally, the side common to a panel An and a panel Bn is based on a straight line that extends from the end, closest to the support 2, of each of the lines joining this panel An with the two neighbouring panels Ai.

Thus, the side common to the panel A1 and the panel B1 is based on the straight line that joins the end of the joining line of the panels A1 and A6, ending firstly at a corner of the hexagon on the support and secondly, at the end (furthest from the measuring device 4) of the line joining the panels A1 and A2.

A second side of a panel Bn is common with a side of a corresponding rigid element En, shaped like an equilateral traingle, hinged on the support.

A third side of a panel Bn connects firstly the tip of the rigid element En, opposite to its side hinge on the support 2 and, secondly the end, at the blower, of the line joining the corresponding panel An with the neighbouring panel Ai. Thus, in the example, the third side of the panels B1 and B2 converge on the end of the line (joining the panels A1 and A2) that ends in the blower.

Preferably, a panel An and the corresponding panel Bn are made out of the same strip of cloth as will be explained further below with reference to the FIG. 3a, and these two panels are coplanar when the internal volume of the chamber is eliminated.

The corner of a panel Bn, associated with the tip of the rigid element En, opposite to its hinged side on the support 2, is a right angle so that when the chamber is empty, the third side of a panel Bn and the joining line of the corresponding panel An with which this third side is joined are aligned and identical with the main axis of the cone.

In the example, the blower corresponding to the panels A1 and A2 thus further comprises two panels B1 and B2. Between the third sides of these panels, B1 and B2, when the chamber is full there are two coplanar and symmetrical, flexible triangular panels, C1 and C2 each having a first common side (shown with dashes) based on the plane passing through the axis of the cone and the line joining the panels A1 and A2. A second side of the panels C1 and C2 is common with the third sides of the panels B1 and B2 respectively. The third sides of each of the panels C1 and C2 are aligned together and are located between the tips of the rigid elements E1 and E2 opposite to their hinged sides on the support 2.

Finally, there are two triangular and flexible symmetrical panels, D1 and D2, which are coplanar when the chamber is full, each having on the one hand a first side common with the third sides of the panels C1 and C2 and, on the other hand, a second side common with each other (shown with dashes in the figure) based on the plane passing through the axis of the cone and the line joining the panels A1 and A2. Finally, each of these panels, D1 and D2, has a third side common with a side of the corresponding rigid element E1 or E2 as shown in the figure.

It is clear that the panels C1 and D1 and C2 and D2 can be formed of one single piece or separate pieces, fixed to each other by sewing, bonding or any other means which preserves their imperviousness.

Of course, facing the panels A3 and A4, there is an identical blower formed by the rigid elements E3 and E4 and then by the flexible elements B3, C3, D3, B4, C4, D4. Facing the panels A5 and A6 there is another identical blower formed by the rigid elements E5 and E6 and by the flexible panels B5, C5, D5, B6, C6 and D6.

FIG. 2 shows the chamber when the air it contains, before it is filled with fluid, has been driven out or else after the fluid has been removed following a series of tests, but when it is still fixed to the support 2 of the mirror.

The flexibly shaped part 1 of the chamber occupies the same position in relation to the support 2 and the testing device 4.

It is seen that the structure is such that there can no longer be any air pocket or residual fluid between the plane passing through the hinging sides of the elements E1, E2 . . . E6 on the support 2 and the testing device 4.

The rigid panels E1, E2, E3 . . . E6 are folded down on the plane of the hexagon and, owing to their equilateral structure, they cover the entire surface of the hexagon as can be seen in FIG. 4a.

The lines joining the panels A1 and A6, A2 and A3 and A4 and A5 occupy the same spatial position between the testing device 4 and one in two angles of the hexagon, while the joining lines of the panels A1 and A2, A3 and A4, A5 and A6, are identical with one another, on the axis of the cone, so that the internal surfaces of the panels A1 and A6, A2 and A3, A4 and A5 are respectively flat against each other, two by two, as is shown in the figure.

Furthermore, owing to the position taken by the rigid elements E1, E2, E3 . . . E6, the panels B1, B2, B3 . . . B6 are respectively in the plane of the panels A1, A2, A3 . . . A6 in such a way that the internal surfaces of the panels B1 and B6, B2 and B3 and B4 and B5 are flat against each other, two by two, just like the internal surfaces of the panels C1 and C2, C3 and C4, C5 and C6, D1 and D2, D3 and D4, D5 and D6.

The result of this is that the entire internal volume of the flexibly shaped part 1 of the chamber is eliminated and that there can no longer be any remaining pocket of air or fluid.

FIGS. 3a, 3b and 3c show the shape of the preferred embodiment of the panels constituting the chamber 1.

FIG. 3a shows the shape of the part containing a panel An and a panel Bn. This part has the shape of a quadrilateral. Its small side ed, at the top of the figure, is designed to be placed near the testing device 4. The panel Bn has the shape of a right triangle, having one side ab, which is adjacent to the right angle, aligned with one side of the panel An. Its other side bc, adjacent to the right angle, is exactly opposite the small side de of the part, and its hypoteneuse ac determines the separation with the panel An.

Referring to FIGS. 1 and 2, it is seen that the panel Bn appears when the chamber is full, subsequent to a folding of the part of FIG. 3a along the fold ac, forming the hypoteneuse of the panel Bn. The point c is the one fixed to an angle of the hexagon based on the support, the length of the side bc corresponds to the radius of the circle in which the said hexagon can be drawn in such a way that the point b can be at the centre of the hexagon when the set is empty, and in such a way that the side bc is identical with the axis of the cone.

FIG. 3b shows a part which may carry the panels Cn and Dn. This part preferably has the shape of a right triangle. One side bf of this right triangle, which adjacent to the right angle, is equal to the radius of the circle within which the hexagon is inscribed. Its other side ab, adjacent to the right angle, is designed to be fixed to the side ab of the panel Bn (FIG. 3a). It is, in fact, the length of the side ab of this part of FIG. 3b which determines the fold ac between the panels An and Bn. This can easily be seen from FIG. 1.

For the chamber to fold and unfold, the length ab must be such that the tip of a rigid panel En can pass under the fold ac between the panels An and Bn. Hence the angle acb or mfb must be at least equal to the angle bcf or bfc of the rigid panel.

The separation between the panel Cn and the panel Dn, which appears when the chamber is full, is shown with a line of dashes joining the right angle to a point of the sides af.

Assuming that the part shown is the one containing the panels C1 and D1, the side af of the FIG. 3b is the one that would separate the panels C1 and D1 from the panels C2 and D2 in FIGS. 1 and 2.

FIG. 3c represents a rigid panel En, in the shape of an equilateral triangle, the length of its sides being equal to the radius of the circle in which the hexagon is inscribed, namely the length of its sides is equal to one side of the hexagon. One side cf of this part is the one hinged on the support 2, for example by means of the fixing elements Fn. The other two sides bc and bf are planned to be connected respectively to the side bc of the part containing the panels An and Bn, and to the side bf of the part containing the panels Cn and Dn.

FIG. 4a shows a view, from the top, of the relative position of the elements when the chamber is folded.

The maximum dimensions of the mirror 5 are shown in broken lines on the support 2. The mirror must be contained in the hexagon limited by the sides (hinged on the support) of the rigid panels E1, E2 . . . E6.

At the tip of these rigid panels opposite to their hinged side, studs 6, 7, 8, 9, 10, 11 are fixed. These studs prevent the mirror from being damaged by any direct contact during folding. The studs may come into contact with the central part of the mirror, but this fact presents no disadvantages since, in mirrors used for astronomical, solar and other applications, the central part is often removed at the end of the machining process.

The various cloth panels An, Bn, Cn, Dn cannot be seen from the top when the chamber is empty, for they are then perpendicular to the sides of the rigid elements En located between the center and the angles of the hexagon.

FIG. 4b is a cross-section view along BB of FIG. 4a, showing the support 2, the rigid parts E3, E6 of the chamber, the associated studs 8, 11 and the mirror 5. The flexible parts have not been shown. It is observed that a slight volume may remain between the rigid elements and the mirror and that, in this slight volume, it is possible to make a partial vacuum with the pump used to deflate the chamber. Furthermore, the volume of air which might remain in this volume is negligible as compared with that of the chamber, and its presence would not lead to any errors in measurements.

In addition to the fact that chamber of the invention can be very easily used because it does not require exceptional means to be installed, it can also be easily dismantled and moved about since most of the elements are made of cloth and can be stored in a small space.

In one alternative embodiment, the elements An are made of a semi-flexible material instead of cloth, a material such as thin sheet metal which, owing to its flexibility, would enable the filling and emptying operations to be performed. These panels are joined together, for example, by coated strips of cloth.

The preferred embodiment described herein is built around a truncated cone structure based on a hexagon. It is possible to make the chamber from any regular, polygonal base possessing an even number of sides which is greater than six. In this case, the rigid elements En would become isosceles triangles with the side hinged on the support smaller than the radius of the circle in which the polygon is inscribed, and the chamber when full would no longer have a truncated cone structure but a star-shaped structure.

When the fluid used for the testing operations is helium, the types of cloth used for the flexible parts are polyester-based, coated with polyurethane or polyvinyl chloride. Polyurethane is more impervious than polyvinyl chloride but does age less well than the latter. The average losses undergone by the device are about 2 liters per square meter per day.

These losses are negligible since, per 24 hours, for a chamber about 30 meters high with a diameter of about 10 meters, they are less than ten-thousandths of the total volume contained in the chamber.

A testing operation is done as follows: the mirror 5 is placed on the support 2 which is then fixed on the flexibly shaped part 1 by the fixing elements F1, F2 . . . F6. The residual air is removed by deflating the chamber so that no pocket remains and this is done, if necessary, by means of a pump. Then the fluid is injected from the generator or storage bladder into the chamber by means of a transfer pump. The injection is done in such a way that overpressure is maintained inside the chamber to prevent its accidental deflation. A series of measurements is then made, the fluid is withdrawn (causing the deflation of the chamber) and this fluid may be sent to the storage bladder. Then the support 2 is disconnected from the chamber and the mirror is removed for rectification or final packaging.

Following a rectification, fresh tests are conducted as described above, starting again with the extraction of the residual air introduced when the support was removed.

What is claimed is:

1. A method to test the polished surface of a mirror comprising:
    placing said mirror on a support;
    fixing said support at one end of a flexible shaped and/or folding chamber;
    mounting a testing device at the other end of said flexible and/or folding chamber;
    eliminating any residual air in said chamber;
    then replacing said removed air by a fluid in which light is propagated homogeneously; and
    testing said mirror.
2. A method according to claim 1 wherein said removable and replacement steps are done, while leaving the support and measuring device in the position that they occupied during said testing operations.
3. A method according to the claim 1 further comprising:
    creating a depression inside the chamber to drive out the air it contains more efficiently.
4. A method according to claim 1, wherein:
    the fluid is recovered before the mirror and the support are removed, following said testing operation.
5. A method according to any of the claims 1, 2 or 3 wherein the fluid is helium.

6. A system for the testing of a polished surface of a mirror comprising:
- a support for the mirror;
- a testing device and a flexibly shaped and/or folding chamber;
- at one first end which is fixed the testing device;
- means for the imperviously fixing of the support to an opposite end of the chamber;
- means to remove the residual air from the chamber;
- means to inject the fluid into the chamber; and
- means to remove the fluid from the chamber.

7. A system according to the claim 6, wherein the chamber has a general truncated cone shape, the small end of which is connected to the testing device the base of which is on the support.

8. A system according to the claim 7, wherein the chamber comprises:
- flexible panels and rigid panels, in the shape of isosceles triangles, arranged so that they can be folded with one another in such a way that the rigid panels prevent the flexible panels from coming into contact with the mirror when the internal volume is removed from the chamber.

9. A system according to the claim 8, wherein the rigid panels are hinged by one of their sides on the support and wherein each of the said rigid panels has a stud near their tip, opposite to their hinging side, the purpose of the said stud being to prevent direct contact between the said rigid panels and the mirror.

10. A system according to the claim 9, wherein the chamber has an even number of at least six rigid panels hinged to the support, by one of their sides, in such a way that the hinging sides form a regular polygon, and wherein the chamber has the same number of main, flexible panels forming a truncated cone connected firstly to the measuring device and secondly, to one in two angles of the polygon formed by the hinged sides of the rigid elements.

11. A system according to the claim 10 wherein, a blower is placed between each pair of rigid elements and the side of the main two corresponding panels between two angles of the polygon connected to the skirt in the chamber formed symmetrically by the said rigid elements on the one hand, and by symmetrical sets of flexible panels on the other.

12. A system according to the claim 11, wherein the main panels are arranged so that, firstly, the joining line between two of these panels, not connected to a polygon angle, is identified with axis of the truncated cone, and secondly, the internal sides of each of the two main panels located on either side of one and the same joining line, ending at an angle of the polygon, are in contact with each other when the chamber is folded.

13. A system according to the claim 12, comprising six main flexible panels, six rigid panels in the shape of equilateral triangles having the same dimensions, the hinged sides of which demarcate a hexagon, and the blowers attached to the chambers formed by triangular-shaped flexible elements joining the rigid elements to the main elements.

14. A system according to the claim 13, wherein a first series of flexible panels is between the part of the main panels which is connected to an angle of the hexagon and the sides of the rigid elements adjacent to this angle, and wherein a second series formed by the other flexible panels is between the first series of flexible panels and the sides of the rigid elements adjacent to the angles of the hexagon left free by the main panels.

15. A system according to the claim 14, wherein the first series of flexible panels is arranged so that, when the chamber is folded, the internal sides of each set, formed of two neighboring panels belonging to two neighboring blowers, are in contact with each other and wherein the symmetrical, flexible panels of the second series are arranged so that the internal sides of each set formed of two symmetrical panels of one and the same blower are in contact with each other, and are arranged so that each side common to the first and second series of flexible panels is based on the axis of the truncated cone.

16. A system according to any of the claims 6 to 15, wherein the rigid elements of the chamber are fixed to the support by means of hinging and fixing elements, arranged to preserve imperviousness.

17. A system according to the claim 16 wherein hinging and fixing elements are maintained on the support by means of quick-fastening means.

18. A system according to the claim 17, wherein the flexible elements of the chamber are made of a cloth based on a polyester support coated with polyurethane.

19. A system according to the claim 17, wherein the flexible elements of the chamber are made of a cloth based on a polyester support coated with polyvinyl chloride.

20. A system according to any of the claims 6 to 15 or 17, comprising:
- a generator and/or a flexible bladder for the storage of testing fluid.

21. A system according to the claim 20, comprising at least one pump for the transfer of fluid between the chamber and the generator and/or the bladder.

22. A system according to claim 21, comprising:
- a pump to reinforce the air extraction process.

* * * * *